United States Patent
Lee et al.

(10) Patent No.: US 9,659,300 B2
(45) Date of Patent: May 23, 2017

(54) SYSTEM AND METHOD FOR CONDUCTING A GIFT VALUE TRANSACTION

(75) Inventors: George Lee, Mountain View, CA (US); Hugo Olliphant, San Francisco, CA (US)

(73) Assignee: PayPal, Inc., San Jose, CA (US)

( * ) Notice: Subject to any disclaimer, the term of this patent is extended or adjusted under 35 U.S.C. 154(b) by 150 days.

(21) Appl. No.: 13/215,991

(22) Filed: Aug. 23, 2011

(65) Prior Publication Data
US 2011/0307343 A1    Dec. 15, 2011

Related U.S. Application Data

(63) Continuation of application No. 11/966,861, filed on Dec. 28, 2007.

(51) Int. Cl.
G06Q 30/00    (2012.01)
G06Q 30/02    (2012.01)
G06Q 30/06    (2012.01)

(52) U.S. Cl.
CPC ......... *G06Q 30/02* (2013.01); *G06Q 30/0601* (2013.01); *G06Q 30/0641* (2013.01)

(58) Field of Classification Search
CPC ...... G06Q 30/06–30/08; G06Q 20/204; G06Q 20/102; G06Q 20/28; G06Q 20/405
USPC .......................................... 705/26, 26.1–27.2
See application file for complete search history.

(56) References Cited

U.S. PATENT DOCUMENTS

| | | | |
|---|---|---|---|
| 2005/0044005 A1 | 2/2005 | Giannini | |
| 2006/0224454 A1 | 10/2006 | Kantor et al. | |
| 2008/0052164 A1* | 2/2008 | Abifaker | 705/14 |
| 2008/0189188 A1 | 8/2008 | Morgenstern | |
| 2008/0319868 A1* | 12/2008 | Briscoe et al. | 705/26 |
| 2009/0037275 A1 | 2/2009 | Pollio | |
| 2009/0063295 A1* | 3/2009 | Smith | 705/26 |

OTHER PUBLICATIONS

"Roots Unveils Ernex-Powered Gift Card Program," (Business Wire, New York: Apr. 20, 2006, p. 1).

* cited by examiner

*Primary Examiner* — Ethan D Civan
(74) *Attorney, Agent, or Firm* — Drinker Biddle & Reath LLP

(57) ABSTRACT

A system and method for conducting a gift value transaction is described herein. The method includes receiving a request for payment for a gift, wherein the request includes buyer-imposed conditions on use of the gift; notifying a gift recipient of the gift; and tracking the gift recipient's account balances at the different merchants with the buyer-imposed conditions.

14 Claims, 5 Drawing Sheets

SYSTEM AND METHOD FOR CONDUCTING A GIFT VALUE TRANSACTION

CROSS REFERENCE TO RELATED APPLICATION

This application is a continuation of U.S. patent application Ser. No. 11/966,861, filed on Dec. 28, 2007, the entirety of which is incorporated herein by reference.

BACKGROUND

Field of the Invention

The present disclosure relates generally to financial transactions and more particularly to a system and method for conducting a gift value transaction.

Related Art

In direct (face-to-face) or online financial transactions customers search for and purchase products and/or services from a merchant. In the case of online shopping, transactions are conducted through electronic communications with online merchants over electronic networks, such as the Internet. During the course of these transactions, customers may provide payment for products and services. In this regard, the products and services may be purchased for use by the customer. Alternatively, in a gift value transaction the products and services may be purchased by the customer and given as a gift item or a gift card that may be redeemed for products and services from the merchant that issued the gift card.

In one gift value transaction scenario, a customer purchases a gift item, a shirt for example, from a merchant directly or via a merchant's online website. The customer provides information relating to the intended gift recipient, such as the person's name and address, to the merchant and the gift item (shirt) is shipped directly or indirectly by the merchant to the intended gift recipient.

In another gift value transaction scenario, a customer purchases a gift card from a merchant directly or via a merchant's online website. The gift card or certificate is then presented or mailed to the intended gift recipient. Generally, the gift card recipient or gift card holder may apply the value of the gift card to any (item) product or service offered by the merchant issuing the gift card. If the value of the item purchased with the gift card is greater than the value of the gift card (overage), the card holder pays the difference. If the value of the item purchased is less than the value of the gift card (underage), the amount remaining on the gift card may generally be applied to another item(s) from the same merchant.

However, as is often the case, the gift recipient may be given a gift item that does not fit or that the gift recipient does not want for one reason or another. Absent the option of keeping the ill-fitting or unwanted gift item, the gift recipient must return the gift item to the online merchant to receive a substitute gift item, i.e., a shirt of the appropriate size or a different gift item. However, returning a gift item for exchange or substitution to a merchant is, among other things, often difficult, inconvenient, and time consuming. For online transactions, additional shipping costs mean that gift returns incur a higher expense for either the merchant or the gift recipient.

Likewise, a gift card recipient may be in possession of a merchant's gift card whose products or services are unwanted by the gift recipient. However, since the gift card was purchased through a particular merchant, if the gift card is to be redeemed, the gift card recipient is limited to redeeming the gift card with that particular merchant.

Accordingly, there exists a need for an improved system and method for conducting a gift value transaction.

SUMMARY

For purposes of summarizing the disclosure, exemplary embodiments of a system and method for conducting a gift value transaction have been described herein.

In one embodiment, a system for conducting a gift value transaction comprises a communication interface; a payment provider system configured receive via the communication interface payment for a gift, notify a gift recipient of the gift, and prompt the gift recipient to accept or reject the gift and receive a response from the gift recipient. If the response is to accept the gift, the gift is released to the gift recipient, and if the response is to reject the gift, prompt the gift recipient to select an alternative gift.

In another embodiment, a network payment provider system includes a holding account. The payment provider system is configured to receive a gift purchase request for one or more gifts having one or more assigned attributes that designate one or more items and one or more merchants for use in acquiring the one or more gifts, process the gift purchase request, deposit funds for the purchase of the one or more gifts into the holding account, and distribute the funds upon acceptance of the gift and identification of a merchant for use of the gift.

In still another embodiment, a method of processing a gift purchase comprises receiving a request for payment for a gift; notifying a gift recipient of the gift; prompting the gift recipient to accept or reject the gift; and receiving a response from the gift recipient, wherein if the response is to accept the gift, the gift is released to the gift recipient, and if the response is to reject the gift, prompting the gift recipient to select an alternative gift in place of the gift.

These and other embodiments will become readily apparent to those skilled in the art form the following detailed description of the various embodiments having reference to the attached figures, the invention not being limited to any particular preferred embodiment(s) disclosed.

Figure 1:
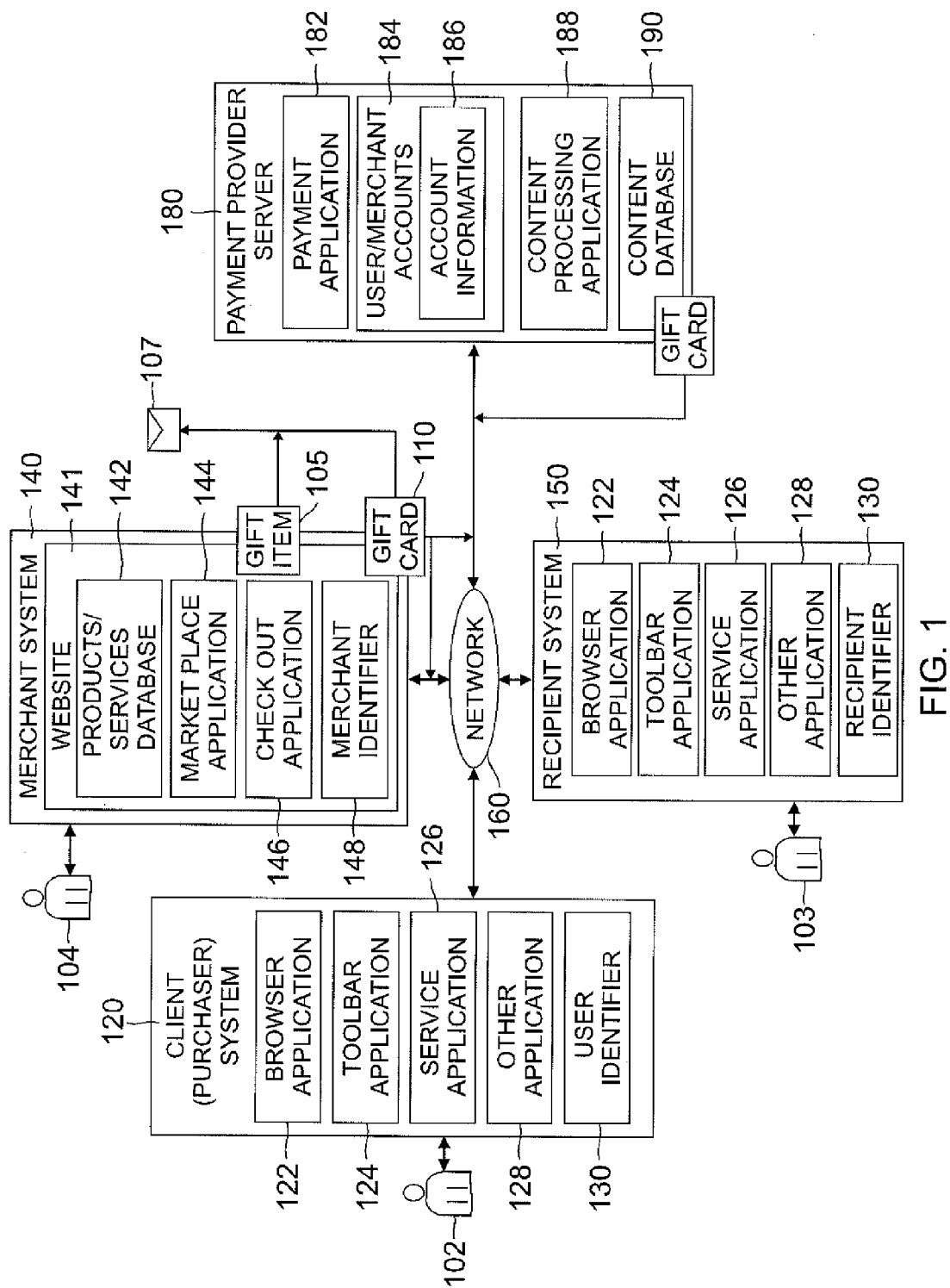
FIG. 1 shows a block diagram of a known networked system configured to facilitate online gift value transactions.

Embodiments of the invention are understood by referring to the detailed description that follows. It should be appreciated that like reference numerals are used to identify like elements illustrated in one or more of the figures, wherein showings therein are for purposes of illustrating embodiments of the invention and not for purposes of limiting the same.

DETAILED DESCRIPTION

Exemplary embodiments will now be described with references to the accompanying figures, wherein like reference numbers refer to like elements throughout. The terminology used in the description presented herein is not intended to be interpreted in any limited or restrictive manner simply because it is being utilized in conjunction with a detailed description of certain embodiments.

Embodiments of the present disclosure overcome the often difficult, inconvenient, time consuming, and limiting nature of gift value transactions including the use of a gift card and/or the return and exchange of a gift item.

Embodiments of a gift value transaction are described herein as it may relate to an electronic payment system environment. An electronic payment system is generally considered as any kind of network service that includes the exchange of money for goods or services. Such network payment system includes, for example, a credit and/or debit card processing system. For convenience, simplicity, and efficiency the present disclosure is described relative to and online or web-based gift value transaction. However, persons of ordinary skill in the art will understand that the teachings of the present disclosure apply equally to a gift value transaction that occurs directly between a buyer and a merchant such as in a face-to-face transaction that may occur in department store or similar type business environment.

In one embodiment, the network may be implemented as a single network or a combination of multiple networks. For example, in various embodiments, the network may include the Internet and/one or more intranets, landline networks, wireless networks, and/or other appropriate types of communication networks. In another example, the network may comprise a wireless telecommunications network (e.g., cellular phone network) adapted to communicate with other communication networks, such as the Internet.

As used herein, a "gift" generally refers to a "gift item" and/or a "gift card". A "gift item", as used herein, is generally considered to include a product and/or service, while a "gift card" or a "gift certificate", as used herein, is generally considered a gift instrument that may be used as payment for a product and/or service.

As disclosed herein, unless otherwise noted, the term "purchase" relates to an amount to be debited from a user's or client's (gift purchaser's) account relative to the gift value transaction as in a gift purchase request for a gift item and/or gift card. In this regard, a "purchase" is linked to an amount designated for a gift item or gift card and is not necessarily associated with any single tangible product and/or service as the eventual product and/or service received by the intended gift recipient may not be determined until after the "purchase" of the gift by the user, and acceptance of the gift and identification of a merchant by the intended gift recipient.

In one known scheme, as generally shown in FIG. 1, a gift value transaction includes a client system 120, one or more merchant servers 140 each having a merchant provided website 141 for the sale of products and/or services, a payment provider 180, and a recipient system 150 available along a network 160.

Persons of ordinary skill in the art will understand that any identification and reference to a client device and its associated user (gift purchaser) and any identification and reference to a recipient system and its associated user (intended gift recipient) in any particular embodiment described herein has been done so for convenience and ease of explaining the subject matter disclosed, and that the gift purchaser in one embodiment may be the intended gift recipient in another embodiment. Accordingly, network connectivity, hardware, software, and activities associated with various gift value transaction embodiments described below as relating to the client system (gift purchaser) or the recipient system (intended gift recipient) is understood to similarly relate to the other device.

In one embodiment, the client system 120 may be implemented using any appropriate combination of hardware and/or software configured for wired and/or wireless communication over the network 160. For example, the client system 120 may be implemented as a personal computer of a user 102 (e.g., a purchaser, a client, a buyer, a customer) in communication with the network 160, such as the Internet. In other examples, the client system 120 may be implemented as a wireless telephone (e.g., cell phone), personal digital assistant (PDA), notebook computer, and/or various other generally known types of computing devices.

In one embodiment, the client system 120 may include one or more browser applications 122 which may be used, for example, to provide a user interface to permit the user 102 to browse information available over the network 160; one or more toolbar applications 124 displaying a graphical user interface (GUI) in connection with the browser application 122 to provide client-side processing for performing tasks in response to operations selected by the user 102; and a service application 126 comprising a software program for facilitating financial transactions, e.g., the direct purchase of gift items 105 (products and/or services) and/or gift cards 110 representing a monetary value for use in acquiring product and/or services on the network 160.

The service application 126 typically comprises a software program, such as the GUI, executable by a processor that is configured to interface and communicate with the one or more merchant servers 140 and the payment provider 180 via the network 160. The service application 126 is configured to provide and display a payment mechanism, such an image or icon, on a display component (e.g., monitor) of the client system 120. The user 102 is able to access merchant websites 141 via merchant servers 140 to view and select items for gift purchase by communicating with the payment provider 180.

The client system 120 may include other applications 128 as may be desired in particular embodiments to provide additional features available to the user 102. For example, such other applications 128 may include security applications for implementing client-side security features, programmatic client applications for interfacing with appropriate application programming interfaces (APIs) over the network 160 or various other types of generally known programs and/or applications.

The client system 120 may include one or more user identifiers 130, which may be implemented, for example, as operating system registry entries, cookies associated with the browser application 122, identifiers associated with hardware of the client system 120, or various other appropriate identifiers. The user identifier 130 may include attributes related to the user 102, such as personal information and banking information. In various implementations, the user identifier 130 may be passed with a user gift purchase request to the payment provider 180, and the user identifier 130 may be used by the payment provider 180 to associate the user 102 with a particular user account maintained by the payment provider 180.

As shown in FIG. 1, one or more merchant servers 140 are maintained by merchants 104 offering various gifts, such as products and/or services, in exchange for financial payment or other consideration to be received from users, such as user 102, over the network 160. In this regard, each one of the one or more merchant servers 140 may include a database 142 for identifying available products and/or services, which may be made available to the client system 120 for viewing and gift purchase by the user 102. Accordingly, each of the merchant servers 140 may include a marketplace application 144 configured to provide information over the network 160 to the browser application 122 of the client system 120. For example, the user 102 may interact with the marketplace application 144 through the browser application 122 over the network 160 to search and view various items, products and/or services identified in the database 142.

Each of the one or more merchant servers 140 may include a checkout application 146 configured to accept payment information from the user 102 and/or from the payment provider 180 over the network 160 to facilitate online gift value transactions of products and/or services identified by the marketplace application 144.

Each of the one or more merchant servers 140 may include one or more merchant identifiers 148, which may be included as part of the one or more gifts made available for purchase so that a particular gift may be associated with a particular merchant 104. The merchant identifier 148 may include attributes related to the merchant 104, such as business and banking information. In various implementations, the merchant identifier 148 may be passed with a user's gift purchase request to the payment provider 180 when the user 102 selects a gift for purchase and processing, and the merchant identifier 148 may be used by the payment provider 180 to associate a particular gift purchased with a particular merchant account maintained by the payment provider 180.

Each of the one or more merchants 104 having a related merchant server 140 may need to establish a merchant account 184 with the payment provider 180 so that the payment provider 180 is able to process transactions having items offered for gift purchase by the merchants 104. When establishing a merchant account 184, each of the one or more merchants 104 may need to provide business information, such as name, address, phone number, etc., and financial information, such as banking information, merchant account information, credit card information, payment processing information, etc.

Each of the one or more merchant servers 140 may be associated with a particular link (e.g., a link, such as a URL (Uniform Resource Locator) to an IP (Internet Protocol) address). In this regard, the payment provider 180 may optionally redirect the browser application 122 to an appropriate webpage and/or merchant site 141 of the merchant server 140 to facilitate purchase of a corresponding gift made available from at least one of the merchant servers 140.

The payment provider 180 may be maintained, for example, by an online payment provider, which may provide payment processing for online transactions on behalf of the user 102 to an operator of the merchant server 140. In this regard, the payment provider 180 includes one or more payment applications 182, which may be configured to interact with the client device 120 and/or each of the merchant servers 140 over the network 160 to facilitate the purchase of gifts by the user 102 from the merchant server 140.

The payment provider 180 may be configured to maintain a plurality of user and merchant accounts 184, each of which may include account information 186 associated with individual users, including the user 102, and the one or more merchants 104 associated with the merchant servers 140. For example, account information 186 may include private financial information of user 102 and merchants 104, such as one or more account numbers, passwords, credit card information, banking information, or other types of financial information, which may be used to facilitate online transactions between the user 102 of the client system 120 and one or more merchants 104 associated with the merchant servers 140. As such, the payment application 182 may be configured to interact with the one or more merchant servers 140 on behalf of the user 102 during a transaction with checkout application 146 without requiring the user 102 to provide account information 186 directly to the merchant server 140. In various embodiments, the methods and systems described herein may be modified to accommodate users and/or merchants that may or may not be associated with at least one existing user account and/or merchant account, respectively.

As shown in FIG. 1, in one method for conducting a client-side online gift value transaction the service application 126 may be installed and run on the client system 120 to allow the client system 120 to communicate with one or more of the merchant servers 140 via the network 160 to select a gift, such as a gift item 105 and/or a gift card 110 for purchase.

In this regard, the client 102 may purchase a particular gift item 105, a blender for example, from the merchant's site 141. The merchant 104 may notify the intended gift recipient 103, for example via email, of the completed gift purchase and intended delivery of the blender by a well-known delivery method 107 to the intended gift recipient 103 at the address provided by the client 102.

Alternatively, in lieu of a gift item, the client 102 may purchase a gift card 110 from the merchant's site 141. Typically, the gift card 110 will have a designated monetary value that may be used by the gift recipient 103 at the merchant's website or store toward the purchase of one or more products and/or services. Typically, once the gift card 110 is purchased, the intended gift card recipient 103 is notified by email via the network 160 that a gift card 110 has been made available. The gift card recipient 103 may than access the merchant's site 141 and use the gift card 110, or the gift card 110 may be downloaded onto the recipient system 150, printed, and used at the merchant's store.

Likewise, the service application 126 allows the client system 120 to further communicate with the payment provider 180 to process online gift purchase requests for gifts selected for purchase and processing in a gift value transaction.

As indicated above, the user 102 may run the browser application 122 on the client system 120 to access at least one merchant website 141 via a related merchant server 140 to search the accessed merchant website 141 and view one or more gifts for purchase.

The user 102 may, for example, generate a gift purchase request for a gift item 105 and/or a gift card 110 by selecting a gift value icon at the merchant's site 141. The selection and payment processing of the gift purchase request for a gift card 110 and/or gift item 105 is generally similar to the selection and payment process for any other item (product or service) intended for personal use from the merchant's site 141.

In this regard, the payment provider 180 receives a gift purchase request from the user 102 via the client system 120. As previously discussed, the user 102 may initiate a user gift purchase request by dragging and dropping an gift icon of a selected gift over the gift value icon, which initiates the user purchase request and online gift value transaction with the payment provider 180.

Next, upon receiving the user gift purchase request, the payment provider 180 verifies the user account information including user identification provider by user 102 in the user's gift purchase request. For example, the user 102 may be prompted by the payment provider 180 to provide user identification 186 or at least verify the user identification for a related user account 184 stored in payment provider 180 so that funds may be deducted from the user account 184 for purchase of the gift item and/or gift card 105, 110. Once proper user identification is provided and/or verified, the online gift purchase may be completed.

In this regard, the gift purchase request may include user information, merchant information, and selected gift item and/or gift card 105, 110 information embedded as arguments in an expression that are passed to the payment provider 180. The user information may include user identifier information, the merchant information may include the merchant identifier information, and the selected gift card information may include one or more image attributes, including gift identifier information, having dynamic arguments identifying the gift and merchant providing the gift item and/or card 105, 110.

Next, the payment provider 180 may prompt the user 102 via, for example, a pop-up window, to verify the gift purchase request. For example, the payment provider 180 may ask the user 102 to select a designated box to complete the gift purchase. Next, the payment provider 180 completes the online gift transaction by deducting the amount of the purchase request from the user account 184 and crediting the amount of the purchase request to the merchant account 184.

The payment provider 180 will generally provide notification and delivery of the gift item and/or the gift card to the intended recipient in a manner similarly used by the merchant, e.g., email, delivery service, etc. The gift item 105 is then obtained by the intended gift recipient, while the gift card 110 may be redeemed for some tangible product or service offered by the merchant 104.

It should be appreciated by those skilled in the art that more than one gift item and/or gift card 105, 110 may be selected prior to completing the online gift purchase. For example, a plurality of gift items and/or gift cards 105, 110 may be selected and placed in a virtual shopping cart and then purchased in a single online transaction. Alternately, each gift item and/or gift card 105, 110 selected for purchase may be purchased separately without departing from the scope of the present disclosure.

As indicated above, the gift recipient 103 may be given a gift item 105 that does not fit or that the gift recipient 103 does not want for one reason or another. Likewise, a gift recipient 103 may be in possession of a merchant's gift card 110 whose products or services are unwanted by the gift recipient 103. As such, as is often the case in the gift transactions shown in FIG. 1 and explained above, the gift recipient 103 may never use the gift card 110, is limited in use of the gift card 110, or the gift recipient must endure the difficult, inconvenient, and time consuming task of returning a gift item 105 for exchange or substitution to a merchant 104.

Accordingly, the present disclosure addresses, among other things, the problems of having to accept or receive a merchant specific gift item and/or gift card (gift) by providing a system and method for conducting a gift purchase and gift value transaction that allows the gift purchaser to assign various gift attributes, and the intended gift recipient to accept or reject the gift having those attributes, or if no attributes have been assigned, to use the gift in an unrestricted manner.

Figure 2:
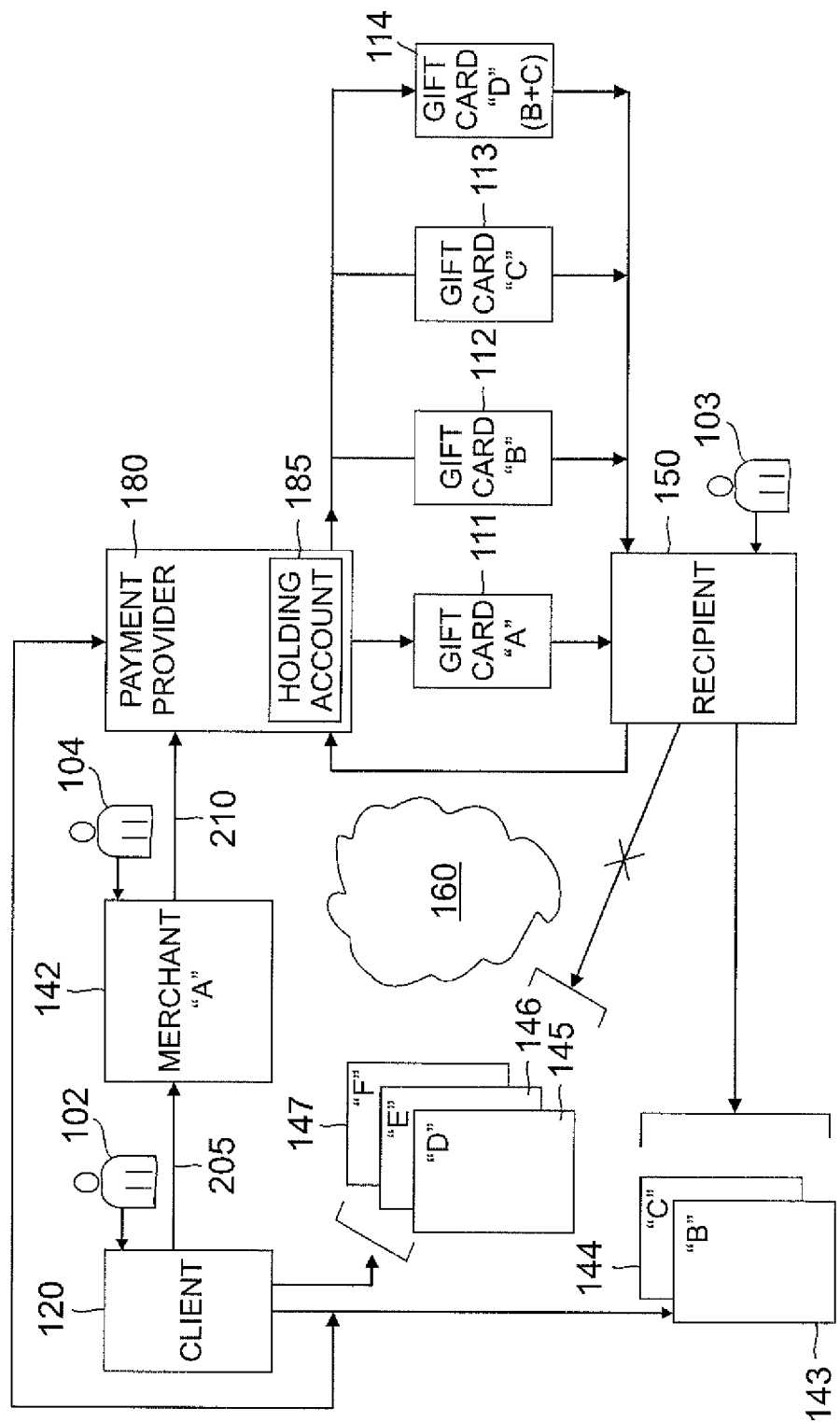
FIG. 2 shows a block diagram of a networked system configured to facilitate online gift value transactions in accordance with one embodiment.

FIG. 2 shows a system and method for conducting a gift value transaction in accordance with one embodiment. The system and method for conducting a gift value transaction includes a client system 120, one or more merchant servers 140 each having a merchant provided website for the sale of products and/or services, a payment provider 180, and a recipient system 150 available along a network 160 and each having various hardware and/or software applications associated therewith as discussed above in regard to the networked devices shown in FIG. 1.

Accordingly, for simplicity, applications including browser 122, toolbar 124, service 126, marketplace 144, and payment 182, to name a few, associated with one or more of the networked devices, as well as other device and/or system functionality either explicitly or implicitly disclosed to facilitate network connectivity and communication relative to the networked devices of FIG. 1, may or may not be discussed or identified below, but are understood to apply to the system and method for conducting a gift value transaction shown in FIG. 2.

In one implementation, the user 102 may run the browser application on the client system 120 to access at least one merchant website 141 via a related merchant server 140 to search the accessed merchant website and view one or more products and/or services available for gift purchase. As discussed in more detail below, the user 102 may select a gift item (product and/or service), a gift card representing a monetary value that may be redeemed toward the acquisition of a product and/or service), as well as assign various gift attributes to the gift item and/or gift card. In this regard, selection of a gift card is shown in FIG. 2, however, it will be understood that the selection, processing, assigning of various attributes by the user 102, and acceptance or rejection of a gift by the intended gift recipient 103 applies equally to a gift item 105.

As discussed above, the service application 126 allows the client system 120 to communicate with one or more of the merchant servers 140 and further communicate with the payment provider 180 to process online gift purchases of selected gifts. In one embodiment, the user 102 may generate a gift purchase request for a least one gift item or gift card by selecting, dragging, and dropping the at least one gift item or gift card over the appropriate gift value icon using a cursor control component (e.g., a mouse). Persons of ordinary skill in the art will understand that other methods of gift selection may apply, for example, the user 102 may select a box during checkout which indicates that the gift item 105 should not be shipped, but held for pre-exchange as described below.

The user gift purchase request may included user information, merchant information, and selected gift service information embedded as arguments in a expression that are passed on to the payment provider 180 to enable payment processing of the user's gift purchase request by the payment provider 180. The user information may include user identifier information, the merchant information may include merchant identifier information, and the selected gift information may include one or more image attributes, including gift identifier information having dynamic arguments identifying the gift and merchant providing the gift for purchase.

In this regard, in one embodiment, user information including user identifier information, merchant information including merchant identifier information, and other information related to the gift purchase such as identifiers for the primary gift and the secondary gift(s), as well as, identifiers for the purchaser and recipient email addresses may be used to map or otherwise track purchasers with gifts purchased and further with intended gift recipients.

Such mapping between the purchaser, gifts purchased, and gift recipients would permit the payment provider system 180 to keep track of the various restricted balances between gift recipients and merchants. For example, gift transaction mapping would permit the payment provider system 180 to maintain account balances indicated that an account holder has a gift balance of a certain amount with a particular merchant. In addition, gift transaction mapping would further permit the payment provider system to maintain records of assigned gift attributes and category attributes as applied to various gifts and the corresponding gift recipients.

In one example, the user 102 may select a gift purchase request for the purchase of a gift card 111 having a designated monetary value for use by an intended gift recipient 103 in acquiring a product and/or service from a merchant.

The payment provider 180 processes the purchase information provided by the user's gift purchase request and completes the online gift purchase by deducting the designated gift card amount from the user's account 184. In one example, completing the gift purchase request may include a confirmation from the payment provider 180 or redirecting the user 102 to a page on the merchant site 141 that confirms their purchase of the selected gift and provides a receipt to the user 102.

As explained below, a gift purchase request of the gift value transaction system and method shown in FIG. 2 may include gift attributes having at least merchant level and/or category level attributes selected by the user 102 from a pull-down menu, provided in a comments box, or otherwise communicated and included in the user information and/or selected gift information passed on to the payment provider 180. As such, in contrast to the gift value transaction system and method shown in FIG. 1, in one embodiment, the merchant is not credited the designated gift card amount until the intended gift recipient 103 accepts the gift and identifies a merchant for gift use or redeems the gift card 111 with a merchant.

The ability to accept or reject a gift card gives the intended gift card recipient greater flexibility and choice in acquiring and using a gift card to obtain products and/or services. Likewise, the ability to assign various attributes to a gift card gives the gift card purchaser greater flexibility and choice in providing products and/or services.

Merchant Level Attributes

Merchant level attributes may restrict or allow use of the gift card by the intended gift card recipient 103 to a particular merchant or group of merchants. For example, in the online gift value transaction system and method shown in FIG. 2, the user 102 may designate that gift card "A" 111 is intended for use at merchant site "A" 142. In this regard, merchant site "A" 142 would be considered the primary merchant site assigned to gift card "A".

However, in the event that merchant site "A" 142 does not have a product and/or service that the intended gift recipient 103 may want to acquire, the user 102 may permit the intended gift recipient to utilize gift card "A" 111 at merchant site "B" 143 and/or at merchant site "C" 144. In this regard, merchant site "B" 143 and merchant site "C" 144 would be considered alternative merchants site assigned to gift card "A".

Alternatively, the user 102 may indicate that in the event that merchant site "A" 142 does not have a product and/or service that the intended gift recipient 103 may want to acquire, the intended gift recipient may utilize the gift card 111 at any merchant site except merchant sites "D", "E", and "F" (145, 146, 147).

Accordingly, gift card attributes assigned by the user 102 may take the form of a merchant restriction attribute (i.e., identifies one or more merchant sites where the gift card can not be used) or a merchant access attribute (i.e., identifies one or more merchant sites where the gift card can be used). Of course, the user 102 may place a merchant specific attribute to gift card "A" 111 such that gift card "A" 111 can only be used at merchant site "A" 142 and no other merchant site. On the other hand, gift card "A" 111 may be purchased having no assigned gift card attributes. As such, the gift recipient 103 would be able to utilize gift card "A" at any available or participating merchant site "A", "B", "C", "D", "E", and/or "F" (142-147).

Similarly, a product and/or service, for example a blender, may be designated as a gift item for an intended gift recipient 103. The user 102 may designate that the intended gift item is associated with merchant site "A" 142. However, the user 102 may assign merchant restriction attributes and/or merchant access attributes such that the intended gift recipient 103 may, if so desired, reject the intended gift item (blender) associated with merchant site "A" and acquire a blender or other product and/or service, as explained in regard to category level attributes, from other merchants as indicated by the merchant level attributes assigned by the user 102.

Category Level Attributes

Category level attributes may restrict or allow the intended gift recipient 103 to use the gift card to acquire one or more product and/or service within a particular category, type, group, theme, etc., of products and/or services. Categories may include, but are not limited to, those related or associated with entertainment, sporting goods, kitchen appliances, youth education, apparel, home and auto repair, etc. For example, in the online gift value transaction system and method shown in FIG. 2, the user 102 may designate that gift card "A" 111 is intended for use in acquiring a product and/or service for entertainment. More specifically, an assigned gift card attribute may indicate that gift card "A" 111 may be redeemed for movie or performing art tickets. In this regard, a category level attribute may be as broad or as narrowly defined as the gift card purchaser 102 desires.

Likewise, the user 102 may assign category level attributes that prohibit or allow access to a category of products and/or services for acquisition with gift card "A" 111. For example, the user 102 may assign a category level attribute that prohibits gift card "A" from being used to acquire tobacco and alcohol products, however, gift card "A" may be used to acquire all other products and/or services.

Similarly, the user 102 may assign category level attributes to a gift item. For example, the user 102 may designate a blender as a gift item for an intended gift recipient 103. In this regard, the blender would be considered the primary gift assigned to gift card "A". However, the user 102 may assign category level attributes that correspond to alternative gifts such that the intended gift recipient 103 may, if so desired, reject the intended "primary" gift item (blender) and acquire "alternative" or "secondary" products and/or services other than the blender from merchant site "A" 142, or other merchant sites as indicated by the merchant level attributes assigned by the user 102 and explained above.

Once a primary or an alternative gift is accepted by the intended gift recipient 103, the gift recipient may designate extras such as a camera case, or additional memory, or colored lens caps that may be added to the gift. These extras may be purchased directly by the gift recipient.

Combined Merchant and Category Level Attributes

As will be understood by those skilled in the art, the gift purchaser 102 may combine merchant level attributes and category level attributes to better define the gift exchange or use parameters. For example, gift card "A" 111 may be assigned merchant level attributes and category level attributes that permit the intended gift card recipient 103 to redeem gift card "A" 111 with merchants "A", "B", and "C" for kitchen appliance and/or lawn care products and/or services. Alternatively, gift card "A" 111 may be assigned merchant level and category level attributes that prohibit gift card "A" 111 from being used with merchants "D", "E", and "F", and for tobacco related products and/or services. In another embodiment, gift card "A" may be redeemable only with merchant "A", and only within one or more specific categories. Another example would include a gift card that is valid across a number of child-friendly sites, but that cannot be redeemed for video games that have a high violence rating.

Aggregation of Gifts

As further shown in FIG. 2, the gift recipient 103 may receive one or more separate gift cards 112, 113 which may, in one embodiment, be aggregated for use as a combined gift card 114. In this way, gift values are "pooled" to potentially increase gift choice to the gift recipient 103. Such a combined gift card may be subjected to the combined merchant level attributes and category level attributes assigned to the one or more separate gift cards 112, 113. For example, a gift recipient might exchange several gift cards or gift items for a single large purchase such as a furniture set.

Recipient Acceptance or Rejection of a Gift

As indicated above, after purchase of the gift by the gift purchaser 102 the payment provider 180 processes the purchase information provided by the user's gift purchase request and completes the online gift purchase by deducting the gift purchase amount from the user's account 184. The gift having assigned merchant and/or category level attributes is then made available for acceptance by the intended gift card recipient 103.

In this regard, because the gift may include assigned merchant level and category level attributes, the gift in one scenario may be redeemed or acquired from any one of a number of merchants. Accordingly, credit of a merchant's account and completion of the gift value transaction may not occur until the gift is accepted and identified for use with a particular merchant or redeemed by the intended gift recipient 103. As such, funds deducted from the user's account 184 are deposited in an intermediary holding account 185 by the payment service provider 180 until queued for distribution to the merchant's account 184 upon acceptance of the gift card and identification of the merchant or the gift card being redeemed by the gift recipient 103. In another embodiment, funds deducted from the user's account are held by the intended merchant.

To make sure the intended gift recipient 103 receives the gift, and perhaps more importantly, to avoid issues of escheatment and settling of outstanding accounts, in one embodiment, the gift recipient 103 is given a predetermined time in which to accept the gift and identify a merchant for use of the received gift. In this regard, if the gift is not accepted within the predetermined time limit, a default acceptance and identification protocol prescribed by the user 102 or payment service 180 may be utilized.

Overage and Underage

Any overage or underage encountered in completing a gift value transaction may generally be handled as previously discussed. That is, if the value of the item purchased is greater than the value of the gift (overage), the gift holder may be requested to pay the difference. Alternatively, in an overage, the user 102 may agree to be charged the excess gift value amount up to some maximum predetermined limit. If the value of the item purchased is less than the value of the gift (underage), the amount remaining may generally be applied to another item(s). Alternatively, the underage may be credited back to the gift purchaser 102, given to the gift recipient as cash, given to a charity, given to the merchant, given as a gift to someone else, held by the merchant or payment service until escheated to a governing body, held by the merchant or payment service until maintenance fees decrement the remaining balance to zero, or held by the merchant or payment service indefinitely. Where the price of a gift item changes prior to redeeming or using the gift by the gift recipient 103, such situations may be viewed and handled as would any other overage or underage situation.

Figure 3:
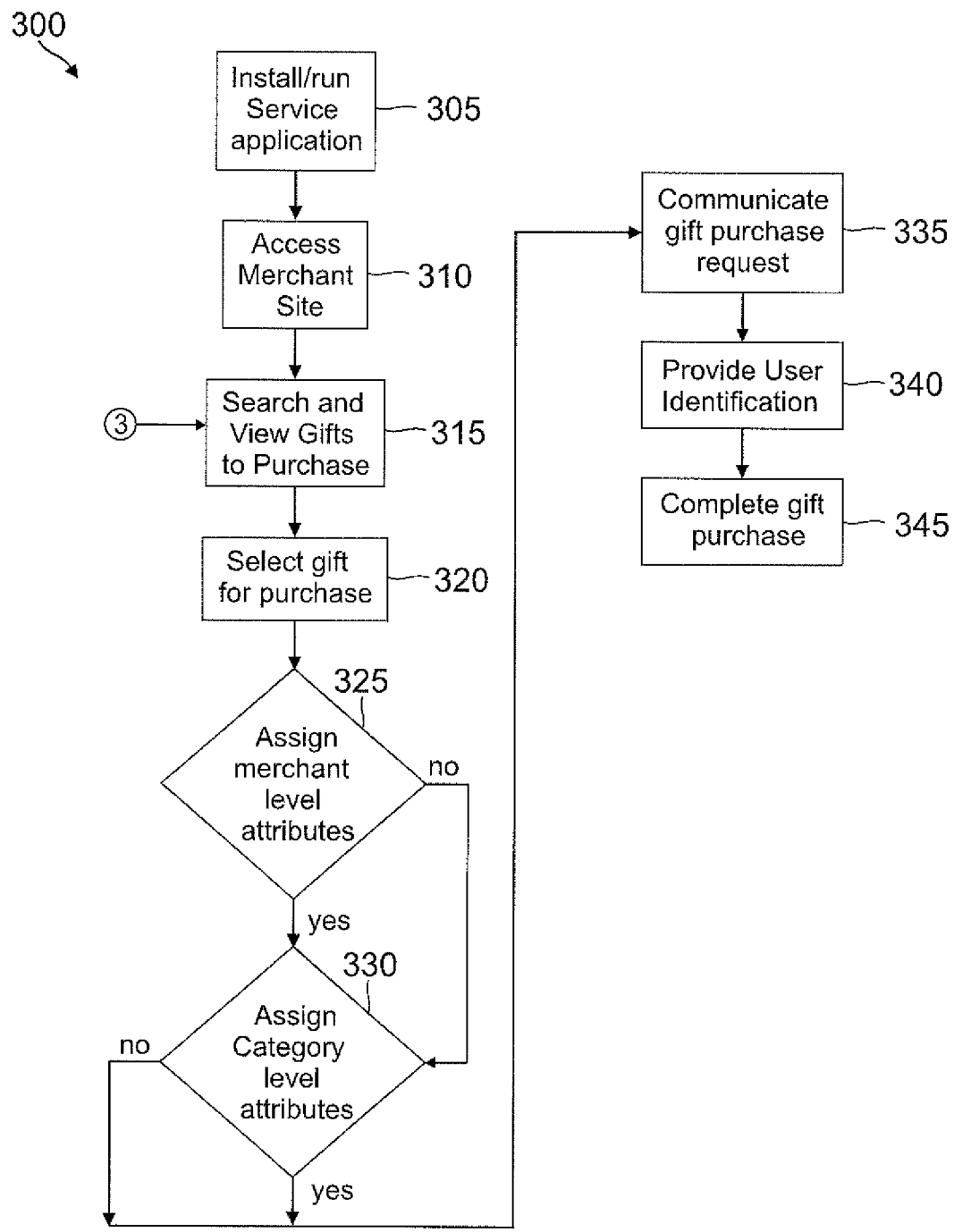
FIG. 3 shows one embodiment of a method for facilitating a client-side online gift value transaction.

FIG. 3 shows one embodiment of a method 300 for facilitating a client-side online gift value transaction with service application 126. As previously, discussed, the service application 126 allows the client device 120 to communicate with one or more merchant servers 140 via the network 160 to select a gift for purchase and further communicate with the payment provider server 180 to process online gift purchase requests.

In one implementation, upon user instruction, the service application 126 may be installed and/or run on the client system 120 (block 305). The user 102 may run the browser application 122 on the client system 120 to access 205 at least one merchant website via a related merchant server 140 (block 310) to search and view one or more gifts (gift item and/or gift card for products and/or services) for purchase (block 315). In one embodiment, upon installation, the user 102 may be prompted to establish a user account with the payment provider 180, wherein the user 102 may use the client system 120 to access the payment provider 180 via the network 160. When establishing a user account, the user 102 may be asked to provide personal information, such as name, address, phone number, etc., and financial information, such as banking information, credit card information, etc. In one embodiment, information related to the user 102 may be packaged as the user identifier 130.

Next the user may generate a gift purchase request 210 for at least one gift by selecting the at least one gift (block 320), assigning one or more merchant level attributes (block 325) and/or assigning one or more category level attributes (block 330), and communicating the gift purchase request to the payment provider system 180 (block 335).

The one or more merchant level attributes may allow and/or restrict the intended gift recipient 103 from using the gift card or acquiring an alternative gift item from selected merchants. Likewise, the one or more category level attributes may allow and/or restrict the intended gift recipient 103 from using the gift card or acquiring an alternative gift item for selected products and/or services.

In one embodiment, the user's gift purchase request 210 may include user information, merchant information including merchant level attributes, and selected gift information included category level attribute that are passed on to the payment provider 180. When enabled, the payment mechanism may transmit the gift purchase request 210 to the payment provider 180 for payment processing.

Once the user 102 selects a gift, the user 102 may be prompted to provide user identification (block 340) and verify the user identification for a related user account 184 stored in the payment provider 180 so that funds may be deducted from the user account 184 for purchase of the gift.

However, it should be appreciated that the user identification may be provided and passed on with the user's gift purchase request 210.

As indicated above, these funds may be held in an intermediary holding account 185 until acceptance of the gift by the gift recipient 103. Once proper user identification is provided and/or verified, for example, by acceptance of the gift item, the online gift purchase may be completed (block 345).

Figure 5:
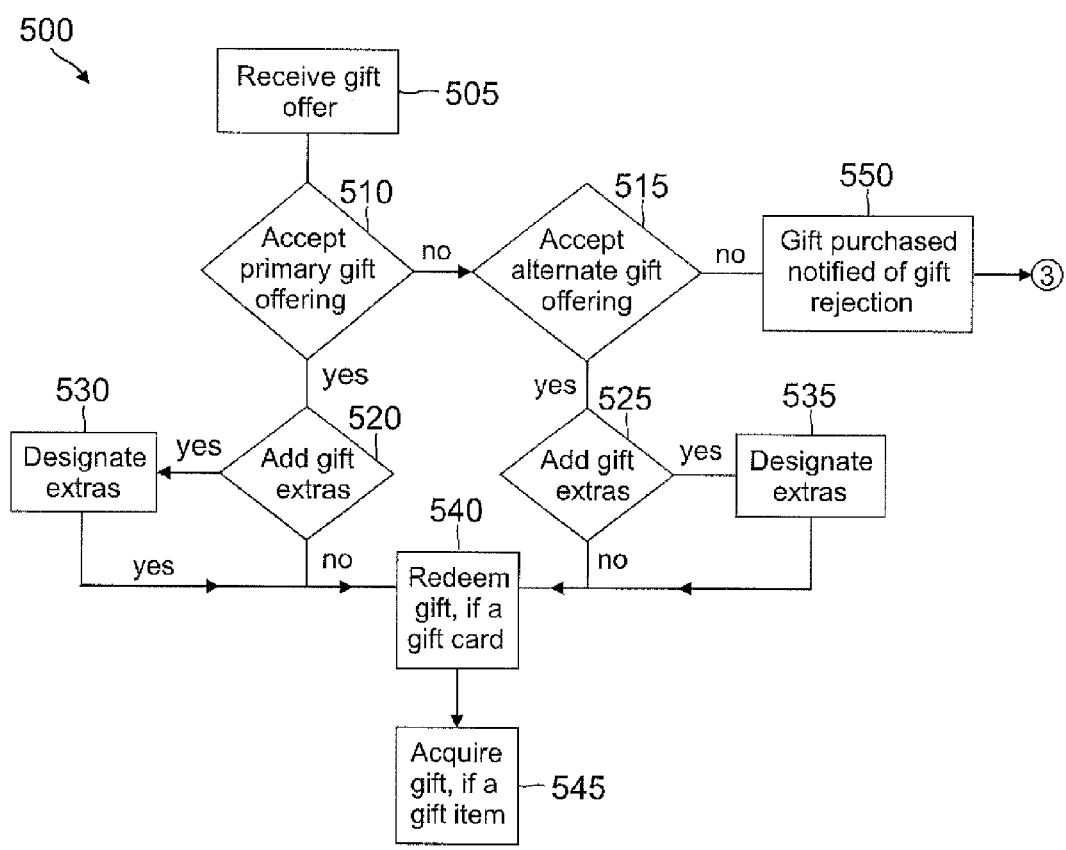
FIG. 5 shows one embodiment of a method for facilitating an online gift value transaction in reference to the intended gift recipient.

As further shown by item connector "3" shown in FIGS. 3 and 5, the user 102 may, upon rejection of the gift by the intended gift recipient, search and view alternative gifts for purchase that may be presented once again to the intended gift recipient 103

Figure 4:
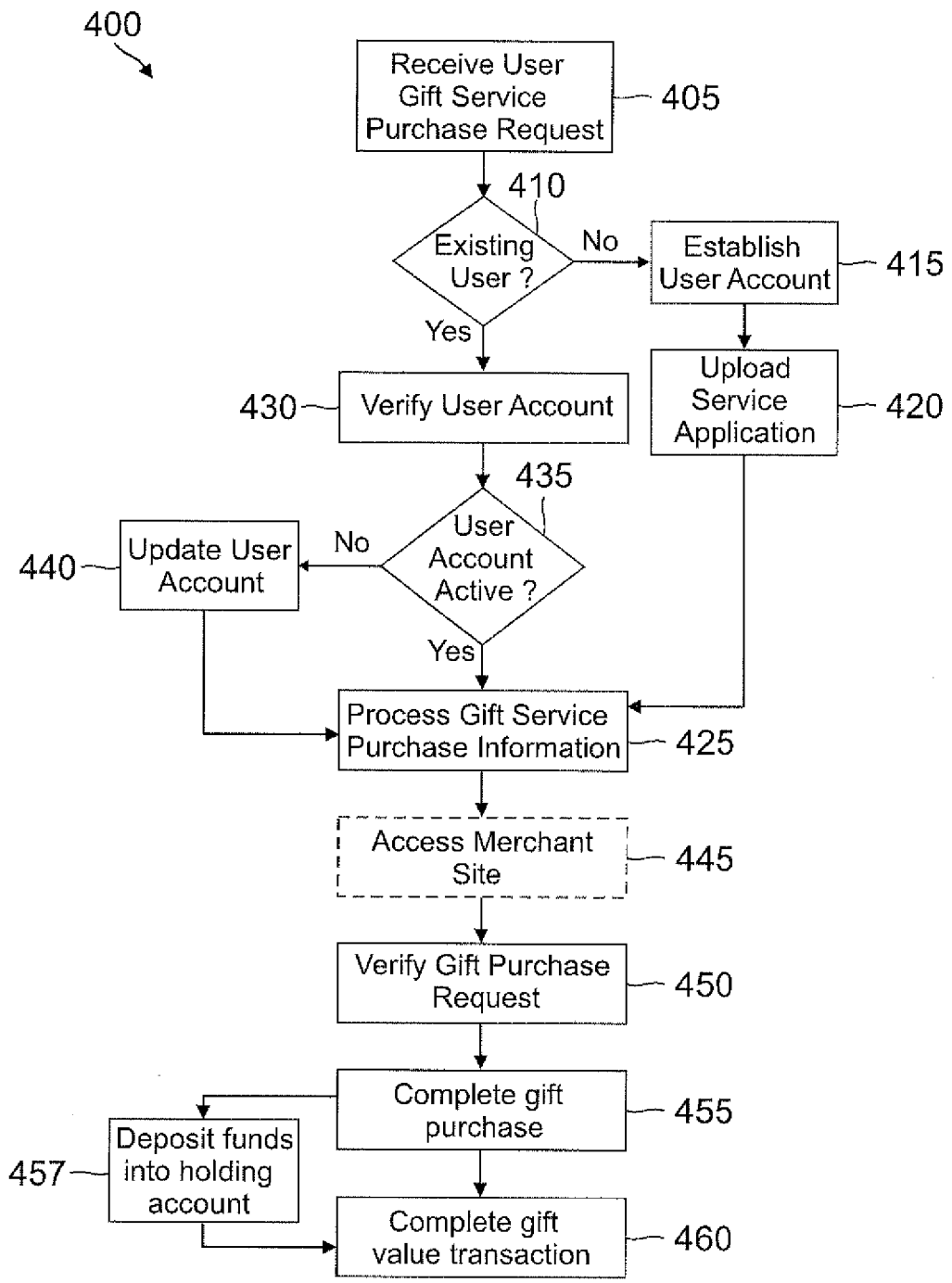
FIG. 4 shows one embodiment of a method for facilitating an online gift value transaction in reference to a payment provider server.

FIG. 4 shows one embodiment of a method 400 for facilitating an online gift value transaction in reference to the payment provider 180.

In one embodiment, the payment provider 180 receives a gift purchase request from the user 102 via the client system 120 (block 405). As previously discussed with reference to FIG. 3, to initiate a user online gift purchase request 210 with the payment provider 180, the user 102 may drag and drop a selected gift for purchase over the gift value icon.

Upon receiving the user's gift purchase request 210, the payment provider 180 determines whether the user 102 is an existing user having an established user account 184 by, for example, checking a user account list in a user account database. If the user 102 does not have an established user account (block 410), then the payment provider 180 prompts the user 102 to establish a user account 184 by providing user information 186 (block 415), and the payment provider 180 uploads the service application 126 to the client system 120 so that the user 102 may install and run the service application 126 on client system 120 (block 420). Once the service application 126 is installed and run on the client system 120, the payment provider 180 processes the gift purchase information provided in the user's gift purchase request 210 (block 425).

Otherwise, if the user 102 is determined to be an existing user by the payment provider 180 (block 410), then the payment provider 180 verifies the user account and user identification information provided by the user 102 in the user's gift purchase request (block 430). For example, as previously discussed, the user 102 may be prompted to provide user identification to purchase any selected gift and complete the online purchase transaction.

Next, the payment provider 180 may determine if the user account is current and active (block 435). In some instances, a user's account information may need to be updated, and thus, the payment provider 180 may prompt the user 102 to update user account information 186 in the user account 184 (block 440). If the user account 184 is current and active, then the payment provider 180 processes the purchase information in the user's purchase request 210 (block 425). It should be appreciated by those skilled in the art that the payment provider 180 may cancel the online gift purchase or gift value transaction at any point in the process if it is determined that the user 102 enters wrong information or the user 102 is trying to purchase a gift with malicious intent.

The payment provider 180 processes the purchase information provided in the user's gift purchase request (block 425). The purchase information may include information related to the gift selected for purchase, information related to the merchant providing the gift selected for purchase, information related to the user including user account number, balance information, credit card information, etc. In one implementation, the payment provider server 180 may optionally access the merchant site via the merchant server 140 to verify purchase information including verifying that the selected gift is available (e.g., in stock), verifying the pricing information, verifying that the merchant account is up-to-date, etc. (block 445). Next, the payment provider 180 may prompt the user 102 via, for example, a pop-up window, to verify the purchase request (block 450). For example, the payment provider 180 may ask the user 102 to complete the gift purchase transaction by selecting a designated box to complete the purchase transaction. In this way, the payment provider 180 is adapted to allow the user 102 to cancel the online gift purchase prior to completion of the transaction.

Next, the payment provider 180 completes the online gift purchase by deducting funds, i.e., the amount of the purchase request, from the user account 184 (block 455). As explained above, funds are deposited into an intermediary holding account (block 457), and the online gift value transaction is completed by crediting the amount of the purchase request to the merchant account 184 (block 460) upon gift acceptance and identification of the merchant by the gift recipient 103. As contact information of the user 102, i.e., gift purchaser is maintained by the payment provider system 180, completing the online value gift transaction may further prompt an acknowledgement and/or a gift acceptance courtesy or gratitude offering such as a "thank you" email message from the gift recipient 103 directed to the user 102 (gift purchaser).

In one embodiment, completing the gift purchase request may include redirecting the user 102 to a page on the merchant site 141 that confirms their purchase of the selected gift to provide, for example, a receipt to the user 102. The payment mechanism may also take different actions, such as adding the gift to a virtual shopping cart and providing buttons to complete the gift purchase at a later time.

FIG. 5 shows one embodiment of a method 500 for facilitating an online gift value transaction in reference to the intended gift recipient 103.

In one embodiment, upon receipt of the gift offer (block 505), the user 102 may accept or rejected the gift offer. In this regard, as the gift offer may include a primary gift offering, as well as, one or more alternative gifts, the gift recipient 103 may accept the primary gift (block 510) or any alternative gift (block 515) as prescribed by the gift attributes assigned to the gift. If acceptance of the primary or alternative gift occurs, gift extras may be added by the intended gift recipient (blocks 520 and 525), typically for a nominal charge, by designating the desired gift extras as described above (blocks 530 and 535). Once a gift (primary or alternative) is accepted and, if desired, gift extras added, the gift card is then redeemed (block 540), or the gift item is then acquired (block 545). In the event the gift recipient 103 rejects the one or more gift offerings designated by the assigned gift attributes, the gift purchaser 102 is notified of the gift rejection (block 550) and may, if desired, search and view further alternative gifts for purchase that may be presented once again to the intended gift recipient 103.

In an alternative embodiment, the subject matter described herein may apply equally to the purchase of subscriptions for items such as magazines, newspapers, and similar periodic digests having reoccurring distribution. For example, a parent may purchase a magazine subscription for their child. The child would then be permitted to exchange to the purchased magazine subscription for a different magazine subscription, a newspaper subscription, or possibly a book of the month club, video, or gaming membership. In this regard, the purchaser is generally committing to an ongoing payment, or at least until the initial subscription expires, while the subscription recipient may choose to exchange the subscription with a different subscription at some point during the purchased subscription period. Persons of ordinary skill in the art will understand the principles described herein may be applied to perpetual gifts, as well as, limited subscription gifts.

In accordance with various embodiments of the invention, a computer device or system, such as devices 120, 140, 160, and 180 described herein and which may further include a personal computer and/or a network server, includes a bus or other communication mechanism for communicating information, which interconnects subsystems and components, such a as processing component (e.g., processor, microcontroller, digital signal processor (DSP), etc.), system memory component (e.g., RAM), static storage component (e.g., ROM), disk drive component (e.g., magnetic or optical), network interface component (e.g., modem or Ethernet card), display component (e.g., CRT or LCD), input component (e.g., keyboard), and cursor control component (e.g., mouse or trackball). In one implementation, disk drive component may comprise a database having one or more disk drive components.

In accordance with embodiments of the invention, the computer system performs specific operations by a processor executing one or more sequences of one or more instructions contained in a system memory component. Such instructions may be read into system the memory component from another computer readable medium, such as a static storage component or a disk drive component. In other embodiments, hard-wired circuitry may be used in place of or in combination with software instructions to implement the subject matter disclosed herein.

Logic may be encoded in a computer readable medium, which may refer to any medium that participates in providing instructions to the processor for execution. Such a medium may take many forms, including but not limited to, non-volatile media, volatile media, and transmission media. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments, execution of instruction sequences to practice the invention may be performed by computer system. In various other embodiments of the invention, a plurality of computer systems coupled by communication link (e.g., network 160 of FIG. 1, LAN, WLAN, PTSN, or various other wired or wireless networks) may perform instruction sequences to practice embodiments in coordination with one another.

The computer system may transmit and receive messages, data, information and instructions, including one or more programs (i.e., application code) through a communication link and a communication interface. Received program code may be executed by the processor as received and/or stored in disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Although the method(s)/step(s) are illustrated and described herein as occurring in a certain order, the specific order, or any combination or interpretation of the order, is not required. Obvious modifications will make themselves apparent to those of ordinary skill in the art, all of which will not depart from the essence of disclosed subject matter, and all such changes and modifications are intended to be encompassed within the appended claims.

What is claimed is:

1. A system for conducting a gift value transaction, comprising:
   a communication interface configured to implement electronic communication; and
   a payment provider system with one or more hardware processors configured to:
   receive via the communication interface a request for a payment for an electronic gift card from a device of a buyer of the electronic gift card, wherein the request comprises buyer-imposed conditions indicating a first gift category at a first merchant and a second gift category at a second merchant from which gifts are redeemable by the electronic gift card;
   electronically deduct funds for the payment of the electronic gift card from an account of the buyer;
   electronically deposit the funds in associated with the electronic gift card to a holding account;
   notify a gift recipient of the electronic gift card and the buyer-imposed conditions associated with the electronic gift card by sending an email to a device of the gift recipient via the communication interface;
   receive via the communication interface an acceptance of the electronic gift card from the device of the gift recipient;

in response to a selection received from the device of the gift recipient, determine whether the selection satisfies the buyer-imposed conditions by verifying that the selection corresponds to one of the first gift category at the first merchant and the second gift category at the second merchant; and in response to the verifying that the selection satisfies the buyer-imposed conditions, distribute at least a portion of the funds for payment of a gift corresponding to the selection from the holding account to the one of the first merchant and the second merchant corresponding to the selection.

2. The system of claim 1, wherein the payment provider system is configured to:

send the electronic gift card to the gift recipient after the electronic gift card has been accepted by the gift recipient.

3. The system of claim 1, wherein the payment provider system is further configured to:

track an account balance of the electronic gift card with the buyer-imposed conditions.

4. The system of claim 1, wherein the payment provider system is further configured to:

receive a rejection of the electronic gift card from the gift recipient; and distribute funds to at least one of the first merchant and the second merchant upon selection of an alternative gift of the gifts by the gift recipient.

5. The system of claim 1, wherein the first gift category is selected from a plurality of gift categories offered at the first merchant and the second gift category is selected from a plurality of gift categories offered at the second merchant.

6. A non-transitory machine-readable storage medium having store thereon machine-readable instructions executable to cause a machine to perform a method comprising:

receiving via an electronic communication network a request for a payment for an electronic gift card from a device of a buyer of the electronic gift card, wherein the request comprises buyer-imposed conditions indicating a first gift category at a first merchant and a second gift category at a second merchant from which gifts are redeemable by the electronic gift card;

electronically deducting funds for the payment of the electronic gift card from an account of the buyer;

electronically depositing the funds in associated with the electronic gift card to a holding account;

notifying via the electronic communications network a gift recipient of the electronic gift card and the buyer-imposed conditions associated with the electronic gift card by sending an email to a device of the gift recipient via the electronic communication network;

receiving via the electronic communication network an acceptance of the electronic gift card from the device of the gift recipient;

in response to a selection received from the device of the gift recipient, determine whether the selection satisfies the buyer-imposed conditions by verifying that the selection corresponds to one of the first gift category at the first merchant and the second gift category at the second merchant; and in response to the verifying that the selection satisfies the buyer-imposed conditions, distribute at least a portion of the funds for payment of a gift corresponding to the selection from the holding account to the one of the first merchant and the second merchant corresponding to the selection.

7. The non-transitory machine-readable storage medium of claim 6, wherein the method further comprises:

sending the electronic gift card to the gift recipient after the electronic gift card has been accepted by the gift recipient.

8. The non-transitory machine-readable storage medium of claim 6, wherein the method further comprises:

tracking an account balance of the electronic gift card with the buyer imposed conditions at at least one of the first merchant and the second merchant.

9. The non-transitory machine-readable storage medium of claim 6, wherein the method further comprises:

receiving a rejection of the electronic gift card from the gift recipient; and distributing funds to at least one of the first merchant and the second merchant upon selection of an alternative gift of the gifts by the gift recipient.

10. The non-transitory machine-readable storage medium of claim 6, wherein the first gift category is selected from a plurality of gift categories offered at the first merchant and the second gift category is selected from a plurality of gift categories offered at the second merchant.

11. A system for conducting a gift value transaction, comprising:

a non-transitory memory storing information about user accounts, wherein the information comprises buyer-imposed conditions on an electronic gift card purchased through a user account; and one or more hardware processors coupled to the non-transitory memory and configured to read instructions from the non-transitory memory to cause the system to perform the steps of:

receive via an electronic communication network a request for a payment for an electronic gift card from a device of a buyer of the electronic gift card, wherein the request comprises buyer-imposed conditions indicating a first gift category at a first merchant and a second gift category at a second merchant from which gifts are redeemable by the electronic gift card;

electronically deduct funds for the payment of the electronic gift card from an account of the buyer;

electronically deposit the funds in associated with the electronic gift card to a holding account;

notify via the electronic communications network a gift recipient of the electronic gift card and the buyer-imposed conditions associated with the electronic gift card by sending an email to a device of the gift recipient via the electronic communication network;

receive via the electronic communication network an acceptance of the electronic gift card from the device of the gift recipient;

in response to a selection received from the device of the gift recipient, determine whether the selection satisfies the buyer-imposed conditions by verifying that the selection corresponds to one of the first gift category at the first merchant and the second gift category at the second merchant; and in response to the verifying that the selection satisfies the buyer-imposed conditions, distribute at least a portion of the funds for payment of a gift corresponding to the selection from the holding account to the one of the first merchant and the second merchant corresponding to the selection.

12. The system of claim 11, wherein the one or more hardware processors is further configured to perform the steps of:

track an account balance of the electronic gift card with the buyer-imposed conditions at at least one of the first merchant and the second merchant.

13. The system of claim 11, wherein the one or more hardware processors is further configured to perform the steps of:
   receive a rejection of the electronic gift card from the gift recipient; and
   distribute funds to at least one of the first merchant and the second merchant upon selection of an alternative gift of the gifts by the gift recipient.

14. The system of claim 11, wherein the first gift category is selected from a plurality of gift categories offered at the first merchant and the second gift category is selected from a plurality of gift categories offered at the second merchant.

* * * * *